United States Patent
Ugalde et al.

(10) Patent No.: US 8,528,957 B2
(45) Date of Patent: Sep. 10, 2013

(54) CARGO MANAGEMENT SYSTEM

(75) Inventors: Gian Carlo Morlet Ugalde, Huixquilucan Edo (MX); Babak Shahmehri, Canton, MI (US); Kathleen Pecoraro, Ann Arbor, MI (US); David A. Wilson, Plymouth, MI (US); Marc Jonathon Lucas, Remagen-Oberwinter (DE); Robert Joseph Beier, Plymouth, MI (US); Timothy DeBastos, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 13/172,673

(22) Filed: Jun. 29, 2011

(65) Prior Publication Data
US 2013/0001972 A1 Jan. 3, 2013

(51) Int. Cl.
*B62D 43/06* (2006.01)
*B62D 21/00* (2006.01)

(52) U.S. Cl.
USPC ............. 296/24.43; 296/37.1; 296/37.16; 280/782; 280/783

(58) Field of Classification Search
USPC ........... 296/24.33, 37.16, 37.14, 37.1, 65.09, 296/65.16, 24.43; 297/334; 180/68.5, 65.1, 180/291, 68.1; 429/100
See application file for complete search history.

(56) References Cited

U.S. PATENT DOCUMENTS

| | | | |
|---|---|---|---|
| 5,011,208 A * | 4/1991 | Lewallen | 296/37.16 |
| 5,632,520 A | 5/1997 | Butz | |
| 6,155,621 A | 12/2000 | Nishida et al. | |
| 6,176,535 B1 | 1/2001 | Chaloult et al. | |
| 6,290,277 B1 * | 9/2001 | Spykerman et al. | 296/24.43 |
| 6,461,090 B1 | 10/2002 | Faber et al. | |
| 6,626,477 B2 | 9/2003 | Maynard et al. | |
| 6,702,355 B1 | 3/2004 | Price et al. | |
| 6,874,667 B2 | 4/2005 | Dykstra et al. | |
| 6,905,155 B1 * | 6/2005 | Presley et al. | 296/37.2 |
| 7,004,274 B2 | 2/2006 | Shibasawa et al. | |
| 7,481,477 B2 | 1/2009 | Yang | |
| 7,690,686 B2 * | 4/2010 | Hashimura et al. | 280/782 |
| 7,766,422 B2 | 8/2010 | Edwards et al. | |
| 7,789,454 B2 | 9/2010 | Kim et al. | |

(Continued)

FOREIGN PATENT DOCUMENTS

| | | |
|---|---|---|
| EP | 1800940 A2 | 6/2007 |
| JP | 5008677 A | 1/1993 |

(Continued)

*Primary Examiner* — Glenn Dayoan
*Assistant Examiner* — Sunsurraye Westbrook
(74) *Attorney, Agent, or Firm* — David B. Kelley; Brooks Kushman P.C.

(57) ABSTRACT

A vehicle is provided with a seat oriented in a passenger compartment forward of a storage compartment. The seat has a seat back that is pivotally connected to a body of the vehicle. The seat back is pivotable between a seating position and a storage position. A battery is disposed within the storage compartment. A tray is removably connected to the vehicle body in either one of a first and a second position. The tray is elevated from the battery within the storage compartment in the first position. The tray is connected to the vehicle body such that it is contiguous with and forward of the battery in the second position. A flat load floor is formed by the top surface of a housing of the battery together with the tray.

20 Claims, 6 Drawing Sheets

(56) References Cited

U.S. PATENT DOCUMENTS

| | | |
|---|---|---|
| 8,353,550 B1 | 1/2013 | Lucas |
| 2006/0181103 A1* | 8/2006 | Khan et al. ................. 296/37.14 |
| 2009/0104511 A1 | 4/2009 | Maguire et al. |
| 2010/0170736 A1 | 7/2010 | Watanabe et al. |

FOREIGN PATENT DOCUMENTS

| | | |
|---|---|---|
| JP | 11048870 A | 2/1999 |
| JP | 2002160564 A | 6/2002 |
| JP | 2005199878 A | 7/2005 |
| JP | 2010116029 A | 5/2010 |
| WO | 2010051646 A1 | 5/2010 |

* cited by examiner

CARGO MANAGEMENT SYSTEM

TECHNICAL FIELD

The invention relates to a seating system and a package tray system for use in a vehicle.

BACKGROUND

Electric vehicles, hybrid-electric vehicles, plug-in hybrid-electric vehicles and electric vehicles typically include a high-voltage traction battery, or multiple traction batteries, that are physically larger than conventional vehicle batteries. Their size makes it difficult to mount them in the engine compartment of the vehicle, so they usually are mounted elsewhere in the vehicle. When they are mounted in the vehicle passenger compartment, available space for vehicle passengers or luggage is reduced.

SUMMARY

In a first embodiment of the invention, a vehicle body includes a passenger compartment, a storage compartment located rearward of the passenger compartment, and a rear door. A seat is mounted in the passenger compartment, forward of the storage compartment. The seat includes a seat back that is pivotally connected to the vehicle body. The seat is generally upright in a seating position, and it pivots towards a front of the vehicle in a storage position. A battery is provided rearward of the seat within the storage compartment. The battery includes a top that defines a first load surface. A tray is removably attached to the vehicle body at a first connection point. In the first embodiment, the tray, in a load position, is connected at the first connection point, to the vehicle body such that it is adjacent to the battery and extends toward the front of the vehicle. The tray, attached in the load position, defines a second load surface. The first load surface and the second load surface are contiguous to define a flat load floor.

In a second embodiment of the invention, a cargo management system, as in the first embodiment, comprises a seat back that is pivotally connected to a vehicle body within a passenger compartment and forward of a storage compartment. The seat back provides support for an occupant when the seat back is in an upright position, and provides access to the storage compartment when pivoted downward to a storage position. The vehicle seating system also comprises a tray. A rearward end of the tray is removably connected to the vehicle body. A forward end of the tray is supported by the seat back when the seat back is in the storage position. The tray and a traction battery are contiguous to define a flat load floor.

In a third embodiment of the invention, the tray has a first end and a second end that is spaced from the first end. The first end of the tray is removably attached to the body of the vehicle in a cover position and in a storage position. In the cover position, the tray is vertically spaced from a top of a traction battery and the second end is located toward the rear of the vehicle relative to the first end. In the storage position, the tray is contiguous with the traction battery and the second end is located toward the front of the vehicle relative to the first end.

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale. Some features may be exaggerated or minimized to show details of particular components. Specific structural and functional details disclosed herein are therefore not to be interpreted as limiting, but merely as a representative basis for teaching one skilled in the art to variously employ the present invention.

Figure 1:
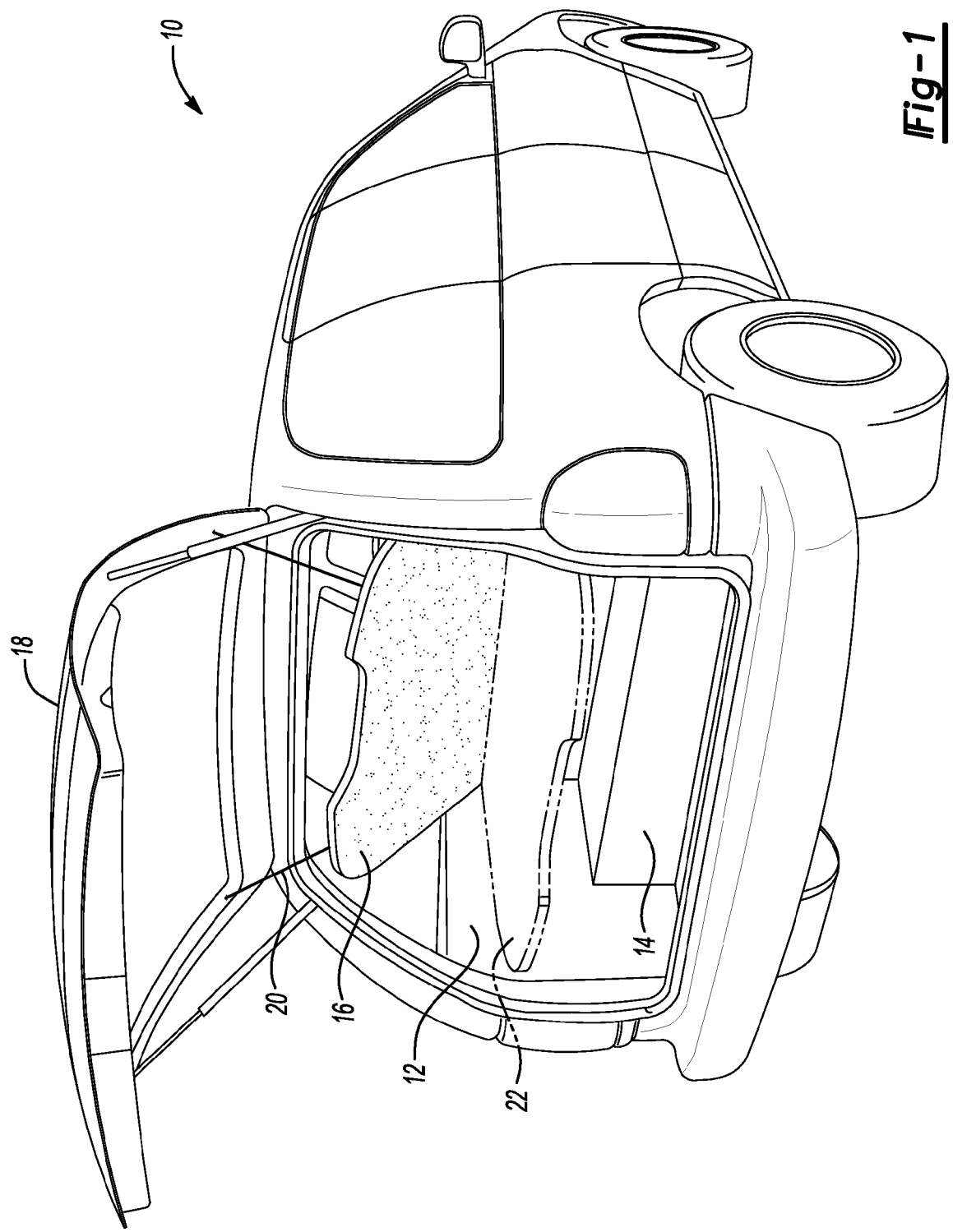
FIG. 1 is a perspective view of a vehicle with a package tray in a cover position.

Referring to FIG. 1, a vehicle 10 is illustrated with the interior of the vehicle defined within a vehicle body 12. A high-voltage battery 14 is provided for storing electrical energy. In accordance to one embodiment, the vehicle 10 is a battery electric vehicle ("BEV") propelled by one or more electric motors (not shown). It does not include an internal combustion engine. The vehicle may also be a hybrid-electric vehicle ("HEV") or a plug-in hybrid vehicle ("PHEV"), which are propelled both by an electric motor (not shown) powered by both the battery 14 and by an internal combustion engine (not shown). In general, BEV's, HEV's, and PHEV's require larger batteries 14, or multiple batteries (not shown), when compared to batteries used in conventional vehicles.

A package tray 16 is provided in the rear of the vehicle 10. The tray 16 is pivotally and removably attached to the vehicle body 12. The tray 16 may further be attached to a hatch or rear door 18 by cables or strings 20. The tray 16 pivots along with the movement of the rear door 18 opening. The tray 16 is designed to shield or cover items that may be located in the rear of the vehicle 10 from outside viewers who may be looking through a window of the rear door 18, for example. When the tray 16 is attached to the vehicle body 12 in the position shown in FIG. 1, the tray may be referred to as being in a first position, or a cover position 22.

Figure 2:
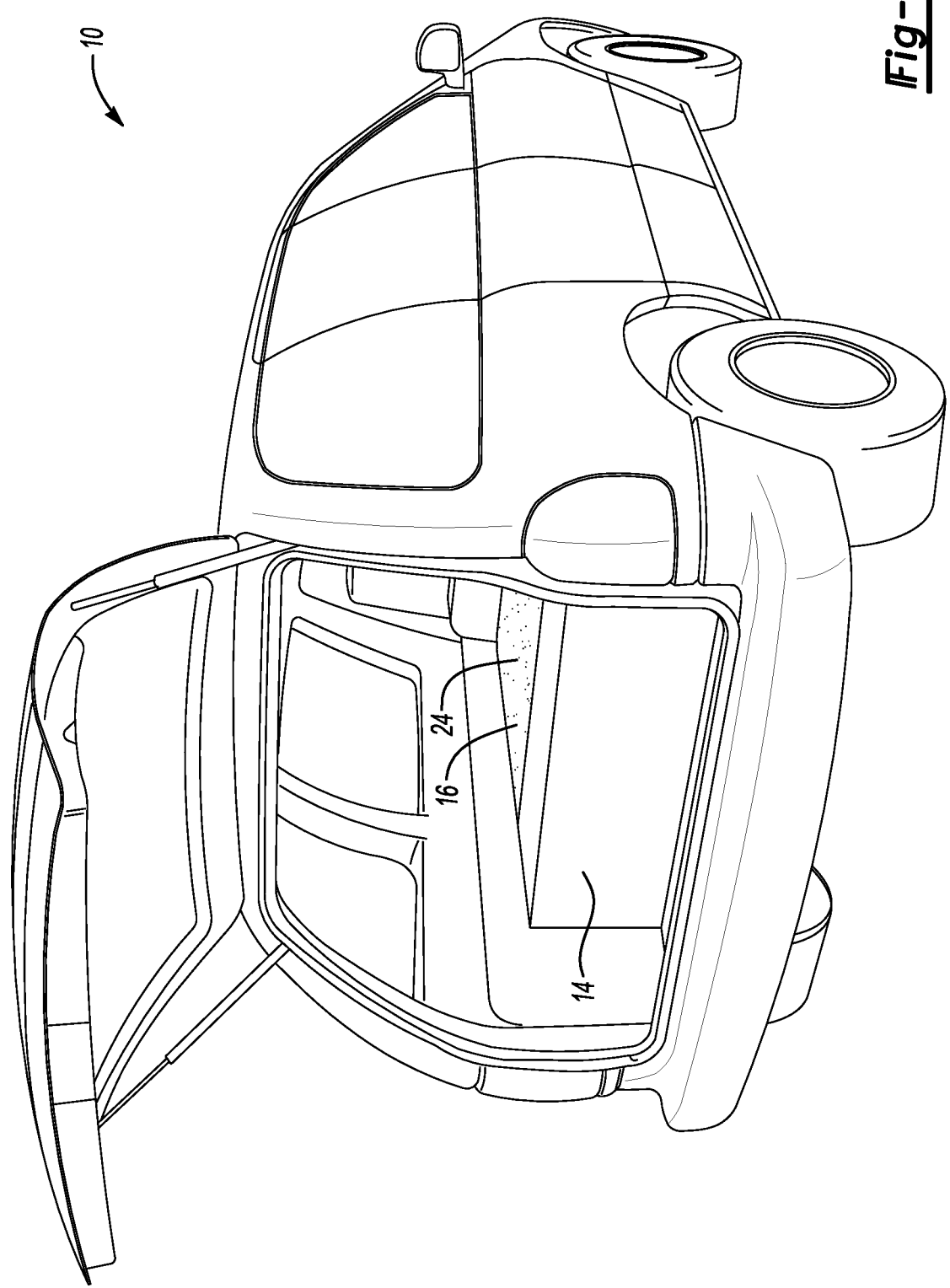
FIG. 2 is a perspective view of the vehicle with the package tray removed from the cover position and mounted in a load position.

Referring to FIG. 2, the tray 16 is shown removed from the cover position 22 (FIG. 1). It is instead in a second position, or a load position 24. In the load position 24, the tray 16 is adjacent to the battery 14. The battery 14 and the tray 16 are generally contiguous in order to define a flat load floor. Having a flat load floor spanning between the battery 14 and the tray 16 allows a user of the vehicle 10 to load items through the rear opening of the vehicle 10 and rest the items on the flat load floor. This may be especially useful when loading long and flat objects, such as planks of wood, that are better supported uniformly from beneath.

Figure 3:
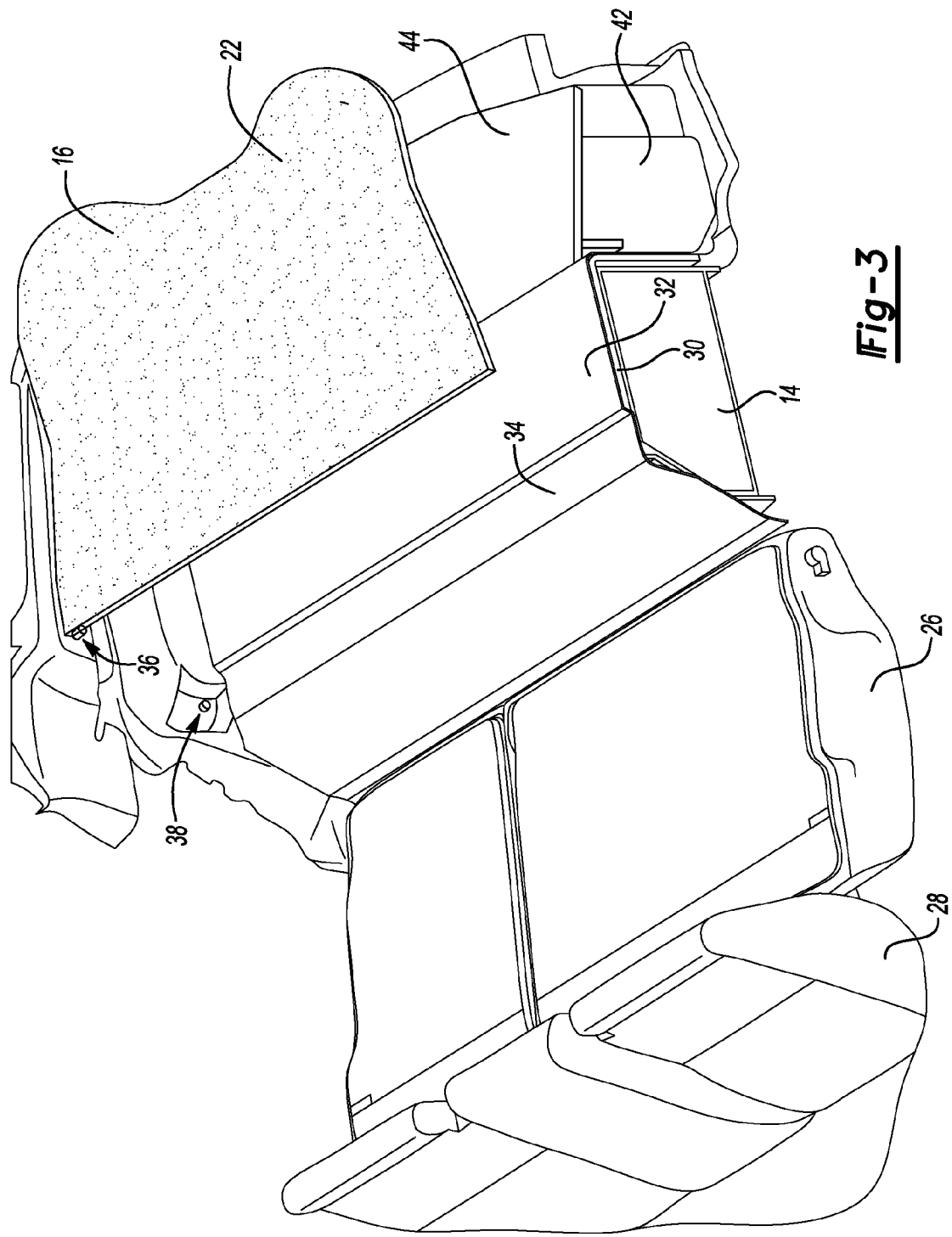
FIG. 3 is a side perspective view of the package tray mounted to a body of the vehicle in the cover position.

Referring to FIG. 3, the battery 14 is an assembly that includes a plurality of cells (not shown) enclosed within a housing 30. The cells store energy and may be formed of a variety of known battery types (e.g., Lithium-Ion, Nickel- Metal-Hydride or Lead-Acid). The cells may receive energy from, for example, an external source with a plug attached, or from regenerative braking of the vehicle.

The tray 16 is shown in FIG. 3 attached in the cover position 22. A seat back 26 and a seat portion, or seat bottom 28, are shown folded towards a front of the vehicle 10 in order to increase volume within the vehicle 10 for loading large items. The seat back 26 and seat bottom 28 may be independently pivotable, and may fold towards the front of the vehicle 10 in known fashion. The battery 14 is located generally rearward of the seat back 26. A housing 30 surrounds the battery 14 and includes a top, or top surface 32. In the cover position 22, the tray 16 is vertically spaced from the top 32. A ledge 34 is provided on the housing and is slightly lower than the top 32. The use of the ledge 34 will be described later with reference to FIG. 4.

Figure 4:
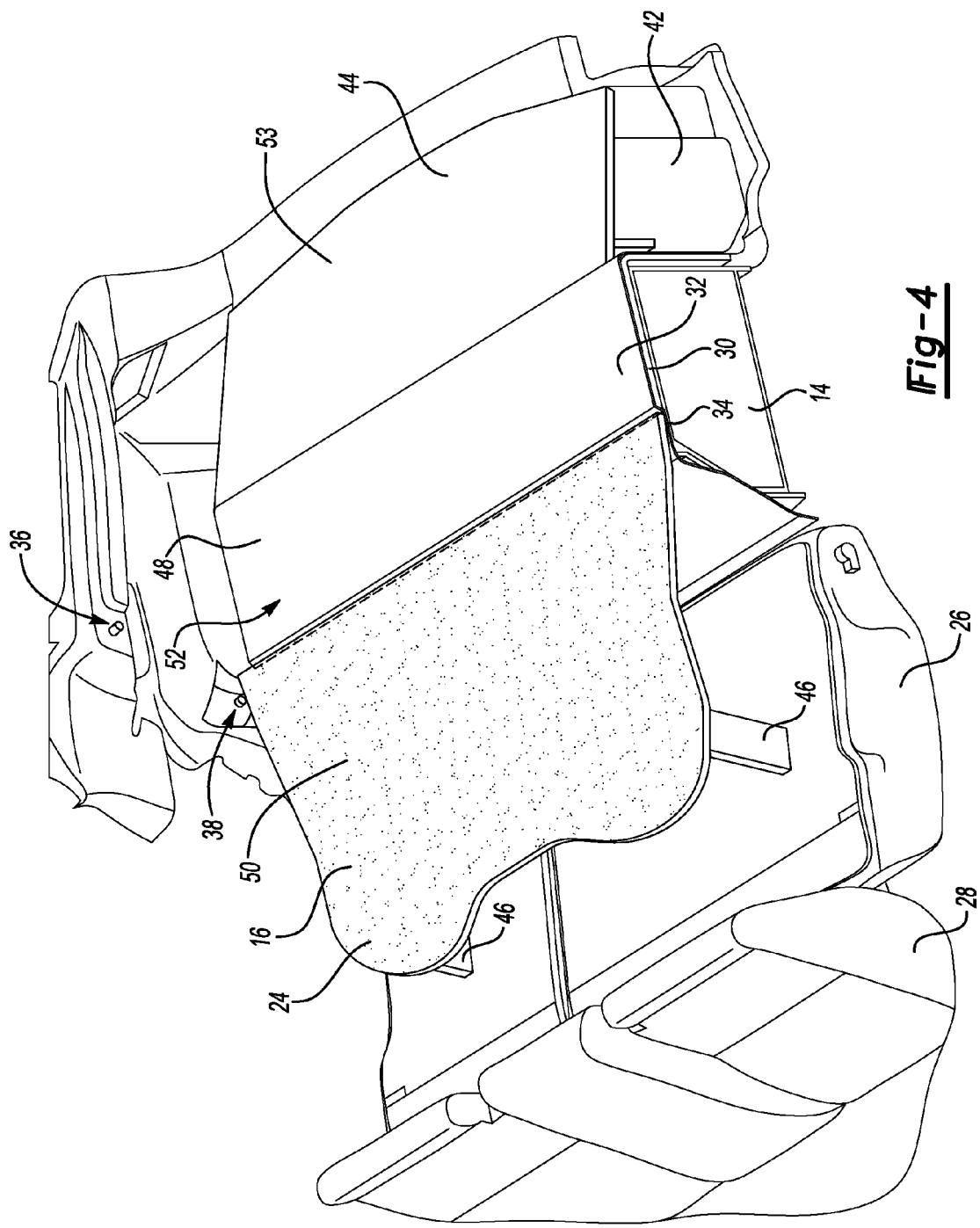
FIG. 4 is a side perspective view of the package tray mounted to the body of the vehicle in the load position.

A fastener is provided at a cover connection point 36. The cover connection point 36 is elevated relative to the battery 14. The cover connection point 36 enables the tray 16 to be connected to the vehicle body 12 in the cover position 22. Similarly, another fastener is provided at a load connection point 38. The load connection point 38 enables the tray to be connected to the vehicle body 12 in the load position 24 (FIG. 4). A bin 42 may be provided rearward of the battery 14 for storing smaller items. A bin cover 44 may also be provided. The bin cover 44 is generally adjacent to the top 32 of the battery housing 30, and slopes downward, as shown at 53, towards the rear of the storage compartment.

The fastener at each of the cover and load connection points 36, 38 may be a bezel, bolt, pin, or some type of protrusion that matches with a corresponding hole, recess or the like in the tray 16. The fasteners may also be on either side of the tray 16 such that the tray 16 is supported from either side of the vehicle 10. It should be understood that the fasteners may be in any position to enable the tray to pivot about the connection points 36, 38 so that, for example, the tray 16 can pivot about cover connection point 36 when the rear door 18 opens (FIG. 1). It should further be understood that the cover connection point 36 may be at any elevation from the battery 14, but may also be level with the top 32 of the battery 14 so that tray 16 directly covers the battery housing 30 when attached in the cover position 22.

Referring to FIG. 4, the tray 16 is removed from the cover connection point 36. It is connected to the vehicle body 12 at the load connection point 38. When the tray 16 is connected to the load connection point 38, the tray 16 is in the load position 24 rather than the cover position 22. Foldable legs 46 are provided beneath the tray 16 and towards the front of the tray 16. When the legs 46 are folded outward from the tray 16, the legs 46 engage the seat back 26 so that the seat back 26 supports the tray 16 from beneath. The legs 46 may be pivotally fastened to the tray 16 and may include springs to bias the legs 46 toward the tray 16. Toward the rear of the tray 16, the ledge 34 of the battery housing 30 supports the tray 16. In this fashion, the tray 16 is generally contiguous with and adjacent to the top 32 of the housing 30.

If, for example, a user wishes to load items in to the rear of the vehicle 10, a first load surface 48 is provided by the top 32 of the battery housing 30. A second load surface 50 is provided by the tray 16 attached in the load position 24. The first and second load surfaces 48, 50 are generally contiguous and level with one another. This creates a flat load floor 52 spanning the length of the first and second load surfaces 48, 50. A third load surface 53 may be defined by the bin cover 44 if the bin 42 is included in the vehicle 10. The front edge of the bin cover 44 is generally contiguous with the top 32 of the battery housing 30. The bin cover 44 may be angled downward from the battery 14 towards the rear of the storage compartment. In this way, the third load surface 53 is not co-planar with the flat load floor 52. The third load surface 53 instead acts as a ramp so that large items may slide up the bin cover 44 and onto the flat load floor 52. It should be understood that the bin cover 44 may also be flat and/or co-planar with the top 32 of the battery housing 30, such that the flat load floor 52 is defined by the length of the first, second, and third load surfaces 48, 50, 53.

Figure 5:
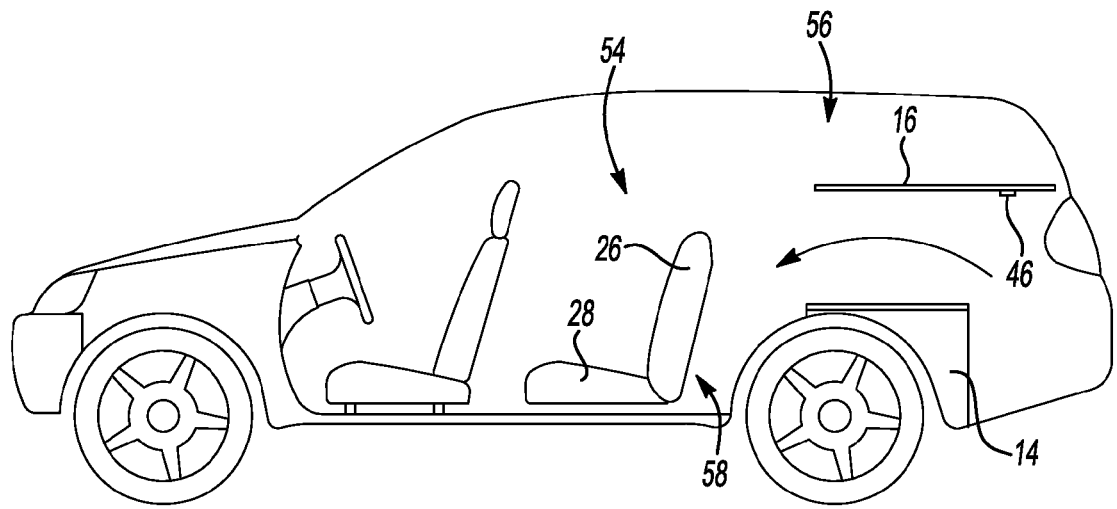
FIG. 5 is a side view of an interior of the vehicle, illustrating the package tray mounted in the cover position.

Referring to FIG. 5, a side view of the interior of a vehicle is illustrated with the tray 16 in the cover position 22. A passenger compartment 54 is provided for seating occupants. A storage compartment 56 is located generally rearward of the passenger compartment 54 for storing items rearward of passengers. The battery 14 is in the storage compartment 56, and may be fixed directly behind the seat back 26. The battery 14 may be disposed above the floor of the vehicle body 12, or may extend below the floor in order to minimize the volume of the battery 14 within the storage compartment 56. The inclusion of the battery 14 in the storage compartment 56 indeed reduces potential storage volume for passengers to store items. The tray 16 is connected in the cover position 22 and elevated from the battery 14 in order to shield items from outside viewers. A seat is provided in a seating position 58 within the passenger compartment 54. In the seating position 58, the seat back 26 is generally upright and the seat bottom 28 faces upward in order to provide a seating surface for occupants.

Figure 6:
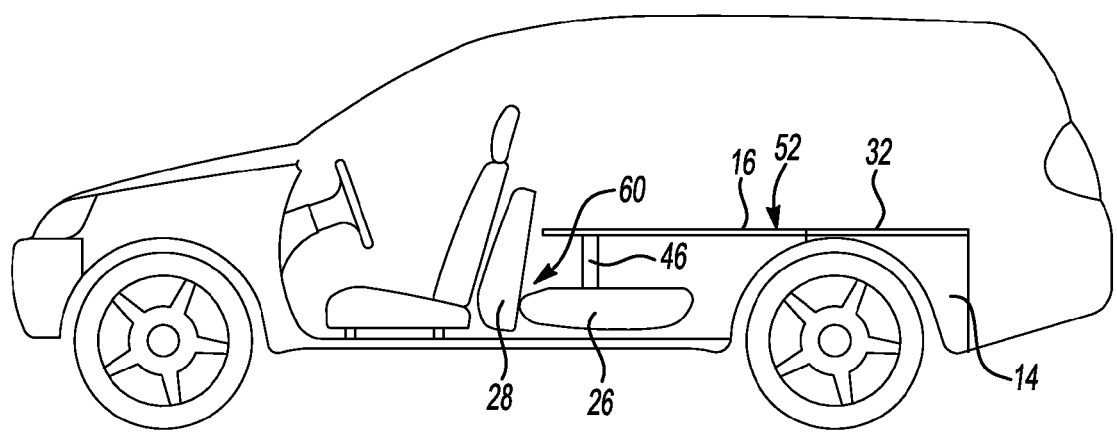
FIG. 6 is a side view of the interior of the vehicle, with a rear seat having a seat bottom and seat back pivoted forward in a storage position, illustrating the package tray mounted in the load position.

Referring to FIG. 6, the seat has been folded into a storage position 60. In the storage position 60, the seat back 26 has been pivoted downward and the seat bottom 28 has been pivoted towards the front of the vehicle 10. It should be understood that there are multiple known ways of folding a seat into a storage position, and this is merely one illustrated example. For example, in another embodiment only the seat back 26 folds downward. In FIG. 6 the tray 16 has also been disconnected from the cover position 22 and attached in the load position 24. Legs 46 are extended outward from the tray 16. The seat back 26 supports the legs 46 of the tray 16. In another embodiment, the seat is folded in such a way that the seat bottom 28 supports the legs 46 of the tray 16. The tray 16 and the top 32 of the battery 14 together define a flat load floor 52.

Figure 7:
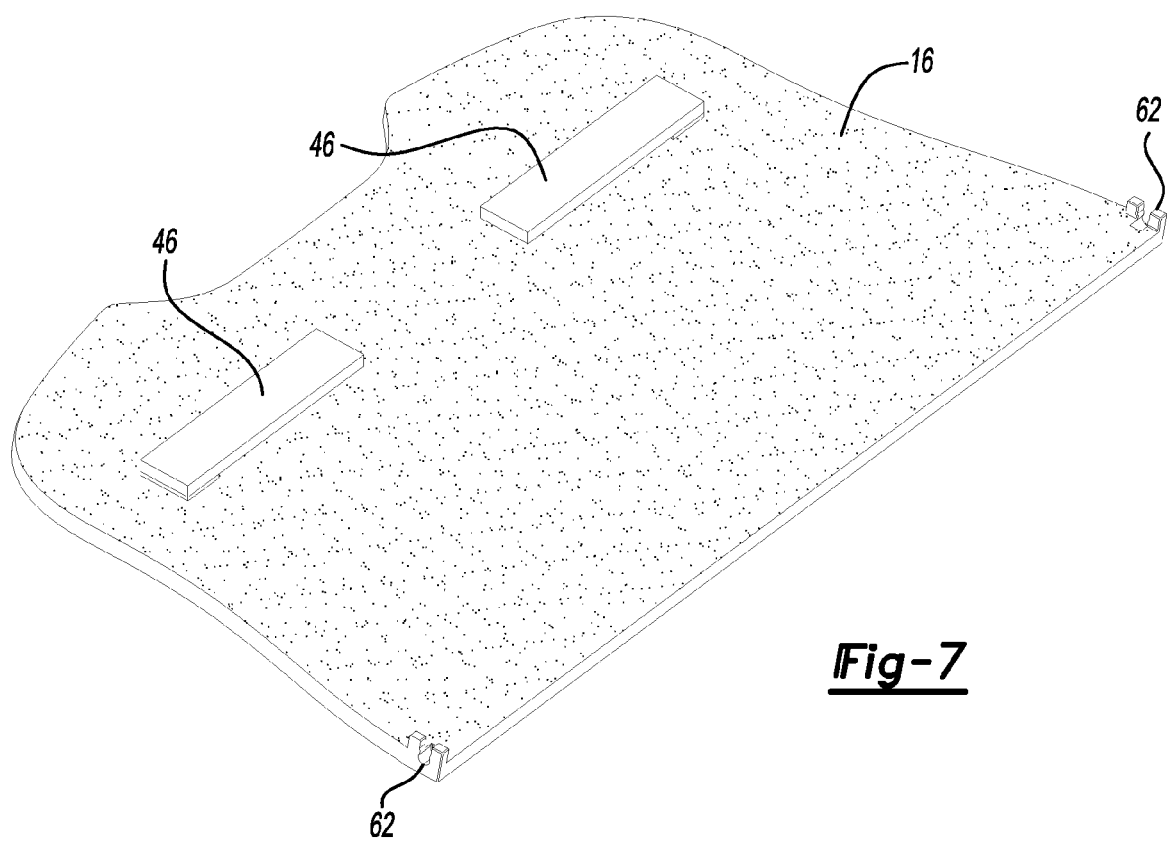
FIG. 7 is a perspective view of the bottom of the package tray in isolation, having foldable legs attached.

Referring to FIG. 7, the underside of the tray 16 is illustrated. Foldable legs 46 are provided in one embodiment so that the folded-down rear seat supports the legs 46 while the tray 16 is level with the battery top 32. In another embodiment, legs 46 are not provided and the underside of the tray 16 rests directly on the folded-down rear seat. Connections 62 are provided on either side of the tray 16.

Referring to FIGS. 3-4 and 7, the connections 62 enable the tray 16 to be removably attached to the vehicle body 12 at both the cover connection point 36 and load connection point 38. In the embodiment shown in FIG. 7, the connections 62 are located on a first end of the tray 16, and an opposite second end of the tray does not include connections. In this embodiment, when the tray 16 is attached to the vehicle body 12 in the cover position 36, the first end is forward of the second end. In order to attach the tray 16 to the load position 24, the tray 16 is removed and rotated 180 degrees such that the first end is now rearward of the second end. In another embodiment, the connection points 36, 38 on the vehicle body 12 are located such that the tray 16 need not be rotated in order to be removed from the cover position 22 and attached to the load position 24. Connections 62 may also be provided on both front and rear ends of the tray 16 so that the tray 16 need not be rotated between the load position 24 and the cover position 22.

Referring to FIGS. 1-7, the connection and operation of the tray 16 will be discussed. When the connections 62 of the tray 16 are connected to the vehicle body 12 at the cover connection point 36, the legs 46 are folded or biased towards the tray 16 and are not used to support the tray 16. Items may be stored in the vehicle 10 above the top 32 of the battery 14, on the floor of the interior of the vehicle 10, and/or below the tray 16. As the rear door 18 opens, the tray 16 pivots about the cover connection point 36 due to strings 20 that connect the tray 16 to the rear door 18. If a user wishes to store large items in the vehicle 10, a rear row of seats may be folded from a seating position 58 to a storage position 60. The tray 16 may be removed from the cover position 22 by disconnecting the connections 62 from the cover connection point 36, and by disconnecting the tray 16 from the rear door 18. The tray 16 is then rotated 180 degrees and attached in the load position 24 by attaching the tray 16 to the load connection point 38 on the vehicle body 12. The legs 46 may then be folded away from the tray 16 so that the tray 16 is supported from beneath by both the folded seat back 26 and the ledge 34. The tray 16 and the top 32 of the battery housing 30 provide a flat load floor 52. The flat load floor 52 thus provides users with a larger and flatter surface to load items onto, as compared to the top 32 of the battery housing 30 or the floor of the vehicle body 12 by itself. The user may later remove the tray 16 from the load position 24, and reattach the tray 16 to the cover position 22.

It should be understood that the battery 14 may also include an outer layer of material, such as carpet, disposed about the housing 30 and over the top 32 to protect or conceal the battery 14. Another layer of material may also be included about the tray 16. In either situation, the load connection point 38 is located such that when the tray 16 is connected in the load position 24, a flat load floor 52 is provided between the top-layer material above the battery 14 and the tray 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle having a vehicle body that includes a passenger compartment, a storage compartment rearward of the passenger compartment, and a rear door, the vehicle comprising:
    a seat in the passenger compartment and forward of the storage compartment, the seat including a seat back pivotally connected to the vehicle body such that the seat back is generally upright in a seating position and pivots toward a front of the vehicle in a storage position;
    a battery having a top that defines a first load surface, the battery being disposed rearward of the seat within the storage compartment; and
    a tray that is removably attached to the vehicle body at a first connection point and in a load position such that the tray is adjacent to the battery, the tray extending toward the front of the vehicle and defining a second load surface when it is attached in the load position;
    wherein in the load position the first load surface and the second load surface are contiguous to define a flat load floor.

2. The vehicle according to claim 1 wherein the seat further includes a seat portion pivotally connected to the vehicle body, the seat portion being configured for pivoting movement toward the front of the vehicle in the storage position.

3. The vehicle according to claim 1 wherein the tray includes foldable legs.

4. The vehicle according to claim 3 wherein the legs are configured to fold away from the tray to engage the seat back to support the tray when the seat back is in the storage position.

5. The vehicle according to claim 1 further comprising a third load surface contiguous with and rearward of the top of the battery.

6. The vehicle according to claim 1 further comprising a bin located rearward of the battery.

7. The vehicle according to claim 6 wherein the bin includes a bin cover that defines a third load surface adjacent to the second load surface.

8. The vehicle according to claim 7 wherein the bin cover is angled downward toward the rear of the vehicle relative to the second load surface.

9. The vehicle according to claim 8 wherein the second and third load surfaces are contiguous.

10. The vehicle according to claim 1 wherein the top of the battery includes a ledge, the tray being partially supported by the ledge when the tray is attached in the load position.

11. The vehicle according to claim 1 wherein the tray is configured to be removed from the first connection point and removably attached to the vehicle body at a second connection point so that the tray is in a cover position, the cover position being vertically spaced from a floor of the storage compartment.

12. The vehicle according to claim 11 wherein the tray is pivotally connected to the second connection point.

13. The vehicle according to claim 12 wherein the tray is further connected to the rear door, such that the tray pivots about the second connection point as the rear door is opened.

14. The vehicle according to claim 13 wherein the rear door is a hatchback door.

15. The vehicle according to claim 1 wherein the tray further comprises:
    an upper surface, a front edge and a back edge that extend from the upper surface; and
    a pair of fasteners located on opposite side edges of the tray;
    whereby the fasteners may selectively engage the vehicle body when:
    (i) the tray is in the load position in which the upper surface of the tray is contiguous with the first load surface of the battery, the back edge abutting the first load surface of the battery, and the front edge being oriented towards a front of the vehicle relative to the rear edge, and
    (ii) a cover position in which the tray is vertically spaced from the top of the battery, and the front edge is oriented toward a rear of the vehicle relative to the rear edge.

16. A cargo management system in a vehicle, comprising:
    a seat back pivotally connected to a vehicle body within a passenger compartment and forward of a storage compartment, the seat back providing for support of an occupant when the seat back is in an upright position and providing access to the storage compartment when the seat back is pivoted downward to a storage position; and
    a tray having a rearward end and a forward end, the rearward end being removably connected to the vehicle body, the forward end being supported by the seat back when the seat back is in the storage position;
    wherein the tray and a top of a traction battery are contiguous to define a flat load floor.

17. The cargo management system according to claim 16, further comprising a seat bottom pivotally connected to the vehicle body wherein the seat bottom pivots towards the front of the vehicle in the storage position.

18. The cargo management system according to claim 16, wherein the tray includes foldable legs that fold away from a bottom surface of the tray enabling the bottom surface to be elevated relative to the seat back.

19. A vehicle package tray system comprising:
a tray having an end portion; and
a set of attachments on a vehicle body configured to enable the end portion to be selectively attached in a cover position in which the entire tray is vertically spaced from a top of a traction battery housing, and a storage position in which the tray is flush with and forward of the top of the housing.

20. The vehicle package tray system of claim 19, further comprising a seat having a pivotable seat back capable of pivoting downward to a storage configuration, wherein the tray includes foldable legs that engage the seat back when the tray is in the storage position such that the seat back supports the tray.

* * * * *